United States Patent [19]

Hilgart et al.

[11] Patent Number: 4,914,290

[45] Date of Patent: Apr. 3, 1990

[54] METHOD AND APPARATUS FOR MEASURING OF MICRODISTANCES

[75] Inventors: Michael J. Hilgart, Westmont; John M. Mucci, Schaumburg, both of Ill.

[73] Assignee: Dukane Corporation, St. Charles, Ill.

[21] Appl. No.: 178,123

[22] Filed: Apr. 6, 1988

[51] Int. Cl.$^4$ .............................................. G01B 11/14
[52] U.S. Cl. ............................. 250/227.30; 250/561; 356/375
[58] Field of Search ............................. 250/227, 561; 350/96.20, 96.29, 96.30; 356/4, 153; 372/6

[56] References Cited

U.S. PATENT DOCUMENTS

| | | |
|---|---|---|
| 3,841,762 | 10/1974 | Pettersson . |
| 4,057,719 | 11/1977 | Lewis . |
| 4,231,663 | 11/1980 | Phillippi . |
| 4,275,296 | 6/1981 | Adolfsson . |
| 4,461,537 | 7/1984 | Raymer, II et al. . |
| 4,559,452 | 12/1985 | Igaki et al. ............................ 250/561 |
| 4,573,760 | 3/1986 | Fan et al. . |
| 4,602,154 | 7/1986 | Taniguchi . |
| 4,694,690 | 9/1987 | Jones et al. ......................... 250/227 |
| 4,728,187 | 3/1988 | Dubroeucq et al. ................. 356/153 |
| 4,744,626 | 5/1988 | Mery .................................... 250/227 |

OTHER PUBLICATIONS

Practical Method for Edge Detection and Focusing for Linewidth Measurements on Wafers by Diana Nyyssone, Optical Engineering, Jan. 1987, vol. 26, No. 1, 081-085.

Primary Examiner—Edward P. Westin
Attorney, Agent, or Firm—Allegretti & Witcoff, Ltd.

[57] ABSTRACT

Microdistances may be measured between a pair of objects such as a laser diode and an optical fiber end extending toward the diode. One orients the ends of a light emitting fiber and a light sensing fiber for the light sensing fiber to sense light from the emitting fiber. One moves the fibers in such relation until the laser diode or other object passes between the emitting and sensing fibers to occlude light passing between them. One then advances the emitting and sensing fibers toward the optical fiber end until light passing between the emitting and sensing fibers increases to a predetermined value, then noting the position of the emitting and sensing fibers. Then, one further advances the emitting and sensing fibers until the second object passes between the emitting and sensing fibers to occlude light passing between them. One then again notes the position of the emitting and sensing fibers. Comparison of the first position noted with the second position noted gives the microdistance between the two objects.

29 Claims, 2 Drawing Sheets

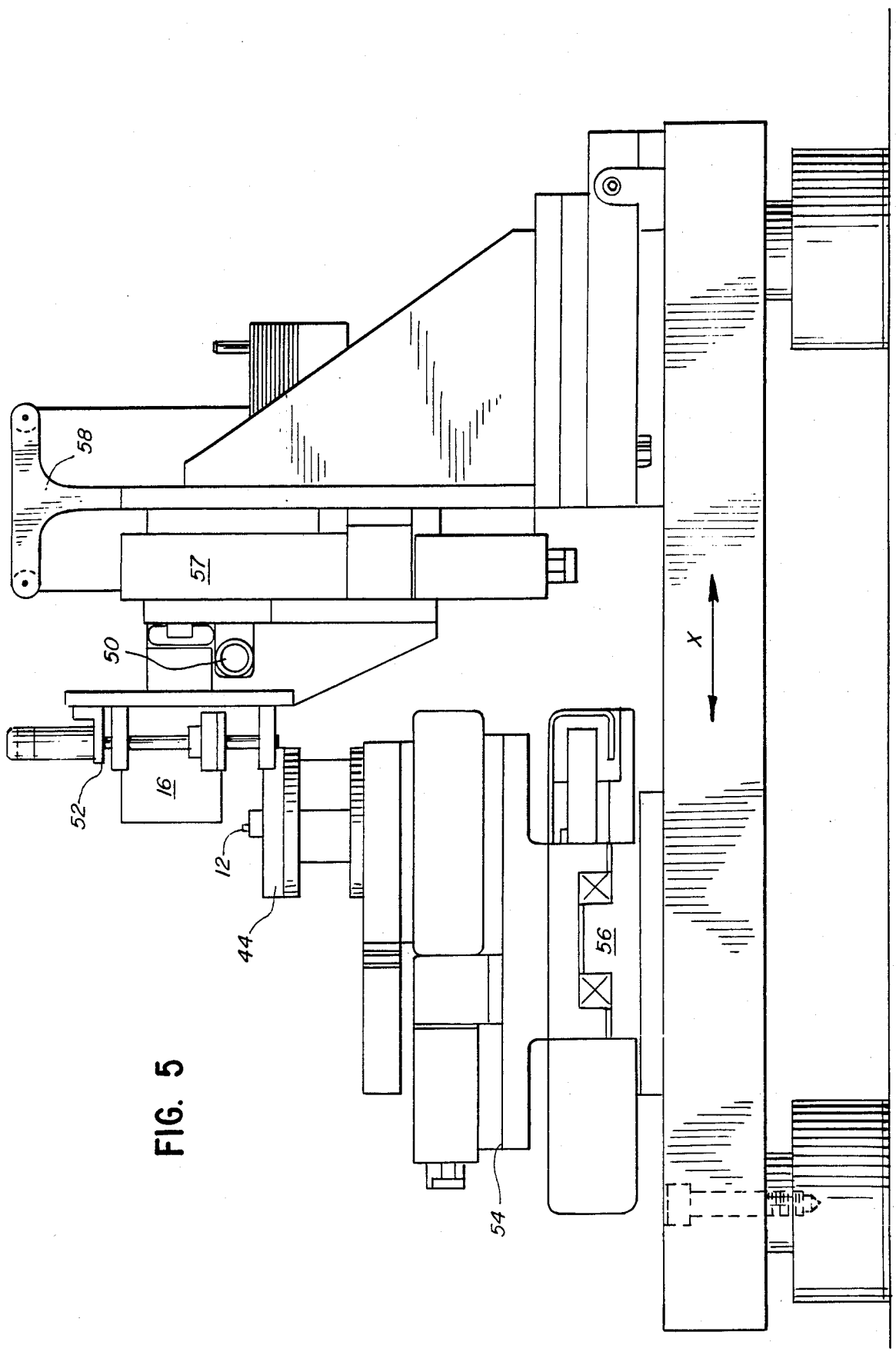

METHOD AND APPARATUS FOR MEASURING OF MICRODISTANCES

BACKGROUND OF THE INVENTION

The invention of this application relates to method and apparatus for measuring microdistances (distances that are typically from 0.1 up to about 300 microns or more) between first and second objects with high accuracy.

For example, in the manufacture of fiber optic systems, it is desirable to bring a single mode or multimode fiber optic member into close relation (typically 2 to 20 microns) with a laser diode chip without scratching the chip, typically as part of a pigtailing operation. Then, the closely spaced fiber optic member may be oriented with the laser diode chip to a position where maximum light from the laser diode chip passes through the fiber optic member, and the laser diode chip and fiber optic member are secured together by a laser welding or other means in that position.

It is distinctly undesirable in such a process to allow the end of the fiber optic member to touch the laser diode chip, since damage can take place if that happens. Accordingly, there is needed a means to reliably move the two members into closely spaced relation of as little as one or two microns, without causing them to touch. By this invention a system for accomplishing the above is provided, with the processing being reliable, of low cost, and suitable for use in the manufacture of commercial quantities of laser diode chips having bonded fiber optic members.

Additionally, the process of this invention may be used for other purposes as well, where it is desired to bring two objects into extremely close proximity while preventing them entering into actual contact with each other.

DESCRIPTION OF THE INVENTION

In this invention, apparatus is provided for measuring the microdistance between a pair of articles. A first holder is provided for holding and positioning one of the articles, while a second holder is provided for holding and positioning a second of the articles.

Sensor means is provided, comprising a light emitting source which typically includes an optic fiber having a free, light emitting end. A light sensing fiber is positioned in space relation from the source to receive light therefrom, the light receiving fiber being positioned to convey light to light detecting means.

Means are also provided for relatively moving the sensor mean in steps of predetermined micromotion from one position where one of the pair of articles blocks light from the source from reaching the light sensing fiber, to a second position where the other of the pair of articles blocks light from the source from reaching the light sensing fiber.

Typically, each step of predetermined micromotion may be on the order of 1/10 of a micron. The sensor means may be carried on a translation stage, with the sensor and first and second holders being movable by stepped micromotion. The phrase "relatively moving" implies that any or all of the parts may be movable. For example, the sensor means may be stationary, and only the first and second holders may move the respective articles, as desired.

The translation stage is operated by motor means, for motion in preferably each dimension, with the motor means being controlled by means to permit the stepped micromotion.

Encoder means are also provided for determining the position of the moveable sensor means and the first and second holders as appropriate, so that the distance between the pair of articles may be determined as a function of the diminution or increase of light from the light emitting source received by the light sensing fiber.

Preferably, the optic fiber which as a free, light emitting end and the light sensing fiber are in other than coaxial relation to each other, preferably in acute angular relation so that the ends may be separated by a very short distance of typically 500 to 1500 microns, just enough to permit the articles being measured to pass between them, but providing greater room due to the acute angular relation for a retention sleeve or the like to hold the respective fibers at a point spaced from their ends.

At least one of the fibers, and typically both of them, has a free end which defines an angled, flat surface, whereby light passes from the optical fiber to the sensing fiber on a path including reflection from such angled, flat surface and typically the angled, flat surfaces of both fibers.

It also may be desirable for the light emitting source to include means to provide light of oscillating intensity. The light detecting means is, in this case, capable of detecting the oscillating light in the presence of background light by circuitry and other means well konwn to the art.

The apparatus of this invention may be preferably used to measure the microdistance between a first object and a second object as follows:

One orients the ends of a light emitting fiber and a light sensing fiber with the first object. The light emitting and light sensing fibers are spaced on opposed sides of the first object so that light is blocked, but they are aligned for the light sensing fiber to sense light from the light emitting fiber when an unobstructed path is present.

One then relatively moves the emitting and sensing fibers together toward the second object until the front face of the first object passes between the emitting sensing fibers to permit light to pass between them, providing indication that the front face of the first object has been found. One then notes the position of the fibers and front face.

One may then further relatively advance the emitting and sensing fibers in their aligned relation until the second object end passes between the emitting and sensing fibers to occlude light passing between them. One can again then note the position of the emitting and sensing fibers and second object to obtain the position of the second object end.

From the two noted positions described above, it becomes a matter of usually simple computation to determine the microdistance between the first and second objects. This microdistance can often be computed to an accuracy on the order of 0.1 micron. With this information, it becomes possible to bring together, in careful, stepwise manner, the first and second objects so that they are spaced from each other by a precise microdistance of as little as 1 or 2 microns, without physical touching.

The first object may typically be a laser diode chip, which is of generally rectangular cross section, having an active, rectangular face which constitutes the front face, with sides on the order of 200-300 microns. The second object may be the light conducting portion of an end of an optical cable. Such an optical cable is typically a fiber optic member encased in cladding. A single mode fiber optic member may typically have a diameter of 8-10 microns, while a multimode fiber optic member may have a diameter on the order of 50 microns.

A rough alignment may take place with the aid of a microscope or magnifying glass, to place the light emitting fiber and light sensing fiber on opposite sides of the second object, or the first object as described above, to avoid collisions between the emitting and sensing fibers and the objects.

Following the orientation and spacing of the first and second objects, in the case where one of the objects is a laser diode chip and the other is the end of a fiber optic member within a cable, the fiber optic member may be moved across the face of the laser diode chip in non-contacting relation until it is well oriented with the light source area from the laser diode chip. Following this, the optic cable end may be laser welded or otherwise attached to the laser diode chip for permanent adherence thereto. This may be accomplished in accordance with the teachings of Morankar et al. U.S. Pat. No. 4,838,639, filed Nov. 2, 1987, entitled Method and Apparatus for Orienting a Fiber Optic Member, or in any other desired way.

It is not necessary in practicing the method of this invention for the light from the emitting fiber received by the light sensing fiber to fall to zero or rise to maximum in order for useful data to be achieved. For example, the invention may be used with improved accuracy by the use of an empirically derived light curve, derived through calibration of the instrument of this invention, correlating the light received for the specific objects measured with the exact positioning of the light source and the light sensing fiber. Ideally, if the intensity of light detected through the light sensing fiber falls to 50 percent of normal, this can be an indication that the forward face of the diode is exactly bisecting the light path, which may typically be 8 or 10 microns in diameter. Thus, by such a quantitative approach, it becomes possible to determine the positions of the respective objects to a degree of accuracy down to fractions of a micron.

DESCRIPTION OF THE DRAWINGS

In the drawings.

FIG. 5 is an elevational view of the apparatus of FIG. 1, rotated 90 degrees about its vertical axis.

DESCRIPTION OF SPECIFIC EMBODIMENTS

Figure 1:
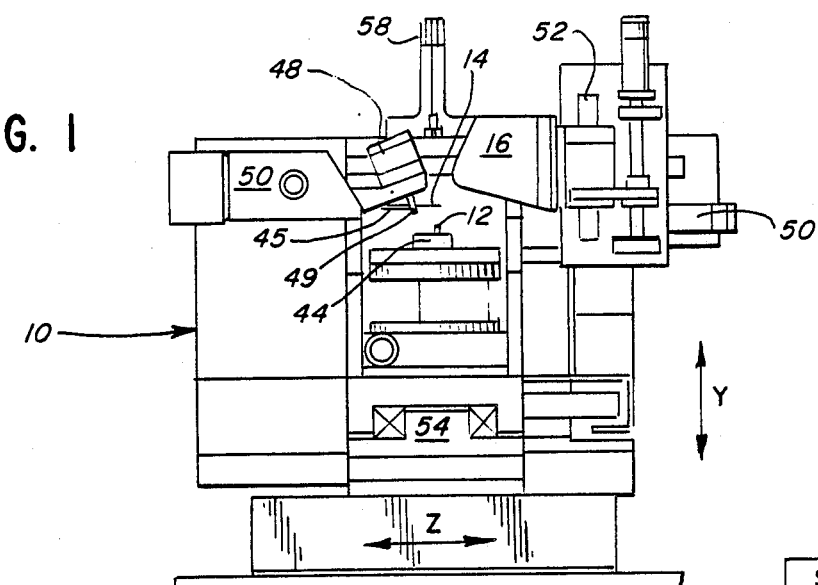
FIG. 1 is an elevational view of a portion of the distance measuring apparatus of this invention.

Referring to the drawings, FIG. 1 shows apparatus 10 for measuring the distance between a laser diode chip 12 and the end 13 of optic cable 14. For this purpose, a sensor member 16 is provided.

Sensor member 16 has a light emitting source 22 which may be of conventional design, coupled with an optic fiber 24 having a free, light emitting end 26, with such light being provided by light emitting source 22, with power being provided through cable 28 to conventional electronics 29 for providing an oscillating light beam, a power supply 31, and appropriate monitors and status display readout for the light source.

Figure 4:
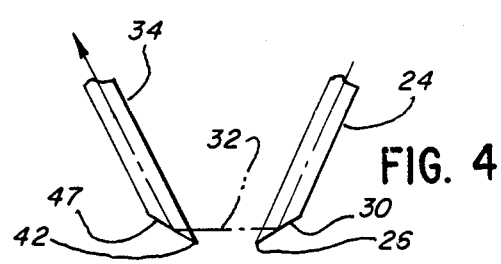
FIG. 4 is an enlarged elevational view of the optic fiber and light sensing fiber of FIG. 2, further showing their relationship.

The end 26 of optic fiber 24 is shown to have an angled face 30 which causes light travelling down optic fiber 24 to be deflected laterally outwardly from face 30 in a light beam 32 (FIG. 4).

Light sensing fiber 34 is also provided to sensor member 16, being carried by light detecting means 36 of conventional design. Light detecting means 36, in turn, is connected by a cable 38 to conventional electronics for processing light signals. As shown a filter amplifier 37 and connected monitor 39 and status display 51 are provided, plus a power supply and a connected monitor and status display 41, so that the light signals may be processed as desired for data interpretation.

Figure 2:
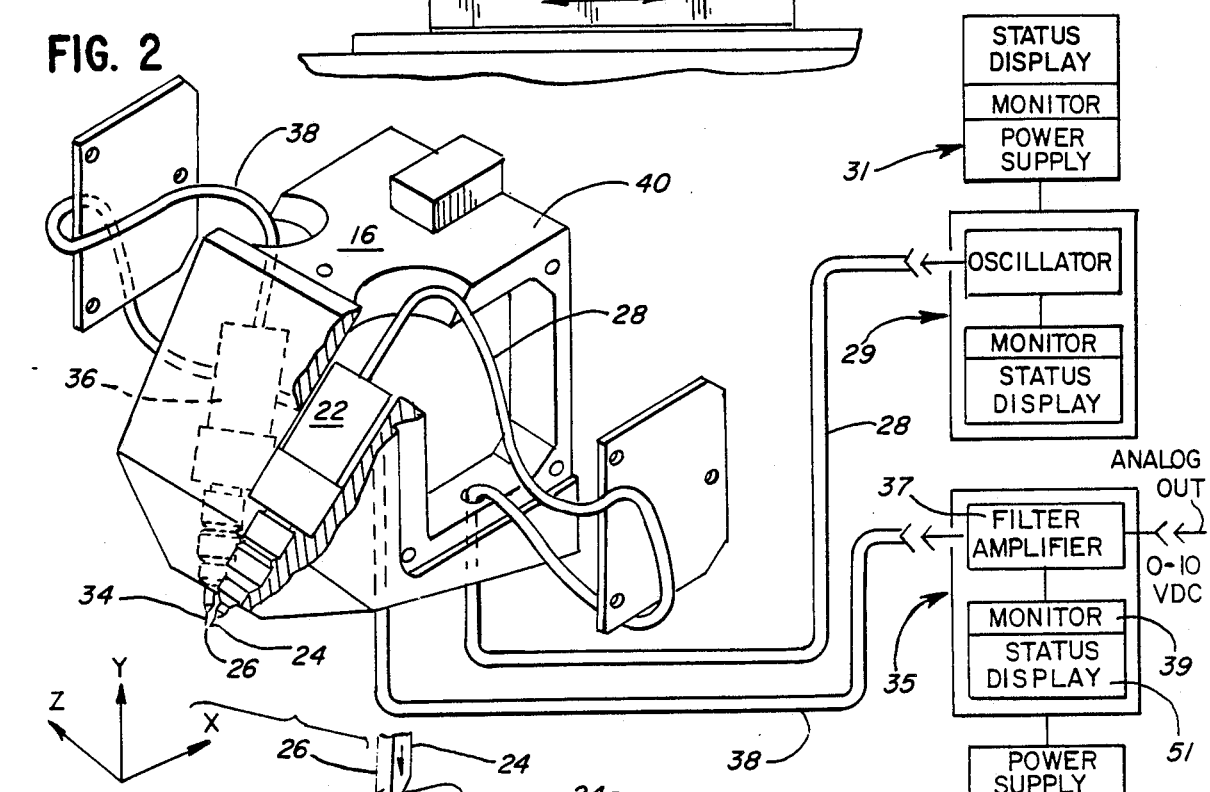
FIG. 2 is an enlarged, perspective view, with portions broken away and exploded, of the sensor means used in the apparatus of FIG. 1.

Light emitting source 22 and light detecting member 36 may be positioned in a housing 40 as shown in FIG. 2 so that fibers 24, 34 are in acute angular relation to each other. This permits the respective ends 26, 42 of the optic fibers to be close together, spaced on the order of about 1000 microns apart, while the remaining and larger light emitting source 22 and light detecting member 36 may be spaced farther apart.

Laser diode 12 may be carried on a first holder 44 while fiber optic member 14, comprising the stripped end of optic cable 45, may be carried in second holder members 48, 50 for precise and firm positioning thereof. Holder member 48 may include gripping arms 49 to hold cable 45.

Light beam 32 from optic fiber 24 can enter end 42 of light sensing fiber 34 to bounce off of angled face 47, to be deflected into a path which is parallel to the axis of fiber 34. Thus, optical fibers 24, 34 may transmit light in an efficient, effective manner despite being in acute-angled, non-parallel relation to each other and spaced from each other. Angled faces 30, 47 may be at other than 45 degrees to the fiber axis to account for the acute angled relation of fibers 24, 34. For example, the angle of fibers 24, 34 may be 30 degrees and the angles of face 30, 47 may be 37.5 degrees.

As mentioned above, it is preferable for the light emitted and passed through optical fiber 24 to be of oscillating intensity. Then, appropriate circuitry 35 including filter amplifier 37 and monitor 39 may be used to detect this oscillating light against background light.

Figure 3:
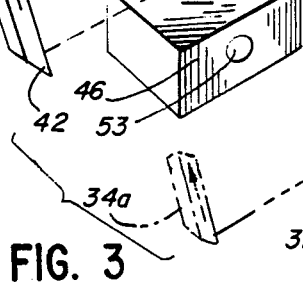
FIG. 3 is a highly enlarged, perspective view showing relationships between the optic and light sensing fibers of the sensor means of FIG. 2 with a laser diode chip and a fiber optic member which are to be brought together.

The apparatus shown herein may be used to measure the distance between the forward face 46 of laser diode 12 and the forward end 13 of fiber optic member 14. This may be accomplished by orienting optic fibers 24a, 34a, as shown in phantom lines in FIG. 3, so that they are in coplanar relation with the end of optic cable 14. This may be accomplished by moving sensor means 16 relative to optical fiber member 14 until the beam of light 32 passing between fibers 24, 34 is dimmed or cut off by a predetermined amount by the presence of end 13 of optical fiber 14. A characteristic dimming pattern for the light may be empirically determined beforehand so that the positions of optical fibers 24, 34 may be precisely predetermined relative to optic fiber 14 by detection of a characteristic optical intensity pattern, as determined by filter amplifier 37 and monitor 39 connected to cable 38. For example, a proper position will be achieved when a characteristic dimming is noted in one position, and the beam between members 24, 34 brightens when any motion toward laser diode 12 is provided.

By this means, the position of the end of optical fiber member 14 along axis Z (FIG. 3) can be determined. In similar manner, the position of the front face 46 of laser diode 12 can be determined, to locate the respective positions along the Z axis of the two members, and thus to measure their separation to the accuracy of the fraction of a micron.

More specifically, the apparatus of this invention may be used with the following steps:

One first loads the chip 12 and fiber 14 into their respective holders as shown. Using a microscope which may be attached to the apparatus, one visually moves sensor member 16 until the sensing fibers 24, 34 intersect the end of fiber 14. The location along the Z axis of the fiber is thus determined in accordance with the characteristic light intensity curve sensed by light detecting means 36, as sensor 16 is moved in fractional micron steps along the Z axis. Such motion may be provided by track and D.C. motor system 50, which may be a conventionally designed system for indexing an object in submicron steps along a slideway or track, with the position being monitored by conventional encoder means. Such a conventional translation stage may utilize, for example, a slideway and lead screws from Mitsubishi Tsubaki Ltd. of Japan.

Sensor 16 may be also moved vertically along the Y-axis (FIG. 3) by means of a second translation stage 52, plus encoder means for determining position, being of similar, conventional design to translation stage 50, to assist in finding the fiber 14.

Thus at least the horizontal plane of fiber 14 is located, and, if desired, the precise location along the Z axis of end 13 may be determined. Alternatively, sensor 16 may be run along the Z axis back to an original position adjacent chip 12 after finding the Y axis position but not the Z axis position of end 13 at this time.

As the next step, one may then move chip 12 axially along the Z axis, and horizontally along an X-axis (FIG. 3), to a pretaught position, making use of encoder means, under the tips of sensor fibers 24, 34. Translation stages 54, 56 may be used for this purpose, each of translation stages 54, 56 being of a design generally similar to the prior translation stages 50, 52.

One may then move sensor 16 and fiber holder 48, 50 (holding fiber 14) together as a single stage in a vertical manner along the Y axis to a pretaught position just above the top of chip 12. Since fiber 14 and sensor 16 are moving together, the precise location of fiber 14 relative to sensor 16 can continue to be known. Typically, sensor fibers 24, 34 will be positioned about 100 microns above the top of the chip. A fifth translation stage 57 is provided for this purpose, moving both sensor 16 and fiber holder 48 together as one, and may also be of similar design to the other translation stages. Stage 57, however, may be biased upwardly by the action of weighted pulley system 58.

Following this, one then slowly moves fiber 14 and sensor 16 down along the Y axis with translation stage 57 until the sensor locates the top of the chip, as indicated by a sudden diminution of light sensed in member 36. This position of the fiber ends is indicated by fibers 24, 34 in FIG. 3.

One then moves sensor 16 forwardly along the Z axis toward fiber 14 (using translation stage 50) until an increase of the light sensed by member 36 indicates the position of face 46 of the chip. This position is recorded, electronically or otherwise, as a critical parameter of the process. One then continues to move sensor 16 along the Z axis by means of translation stage 50 until another diminution of light sensed by member 36 is detected, indicating the presence of end 13 of fiber 14 in the light path 32a as emitted by fibers 24a, 34a. This particular position of the fibers 24, 34 is also noted, electronically or otherwise.

Now, from the two noted positions, it becomes possible to determined the spacing of face 46 from end 13 of fiber 14 to a fraction of a micron. One may thus move chip 12 along the Z axis, using translation stage 56, closer to fiber 14, so that the gap between face 46 of chip 12 and the end of fiber 14 is typically about 100 microns. Then, one may operate translation stage 57 to move sensor 16 and fiber 14 down along the Y axis to a predetermined distance corresponding to the expected area 53 of light emission from laser chip 12, the actual spot of light emission 53 being perhaps only 10 microns in diameter. One may then scan through apparatus connected to optical fiber 14, moving fiber 14 vertically with translation stage 57 and chip 12 horizontally in the X direction by means of translation stage 54, typically at about 3 micron jumps, until maximum light is sensed through fiber 14.

Following this, one may move chip 12 along the Z axis, using translation stage 56, to bring the fiber 14 and face 46 to their final gap separation of only a few microns as may be desired. One may then rescan along the X and Y axes as before to be sure that fiber 14 is oriented to received maximum light. Following this, fiber 14 may be pigtailed to the surface 46 of laser chip 12 by any desired method.

Thus, by this process, which may be done in an automated manner controlled by computer software, optical fibers or other similar devices may be brought into extremely close proximity with a surface without touching the surface, for further processing as may be desired.

It may be noted that after the ends of optical fibers 24, 34 are brought into coplanar relation with optical fiber 14, translation stage 52 is not operated again until the completion of the process, so that from that time on, sensor fibers 24, 34 remain in coplanar relation with fiber 14, within a plane which includes the line defined between the sensing fibers 24, 34, and a line parallel to the axis between fiber 14 and chip 12.

The signal carrying the desired diminution of light passing through cable 38 is processed by filter amplifier 37 and monitor 39 to record the various positions of sensor member 16. Then, it becomes an easy matter of computation, which may be done by a microprocessor in the system, to determine the distance between first and second positions, accurate to fractions of a micron, to get the distance between faces 46 and 13. This distance may then be displayed on status display 51 as a distance readout.

The above has been offered for illustrative purposes only, and is not intended to limit the scope of the invention of this application, which is as defined in the claims below.

That which is claimed is:

1. A method of measuring the micro-distance between a first object having a front face and a second object having a front end, which comprises:

orienting ends of a light emitting fiber and a light sensor fiber in a coplanar relation with the face of the first object that faces the second object, said light emitting and light sensing fibers being spaced from each other, but aligned for said light sensing fiber to sense light from said light emitting fiber, and noting the position of said light sensing and emitting fibers and first object face;

and relatively moving said sensing fibers together until the front end of said second object passes between said emitting and sensing fibers to occlude light passing between them, and noting the position of said fibers and front end, whereby the distance of separation between the face of the first object and the front end of the second object can be determined.

2. A method of measuring the microdistance between a first object having a front face and a second object having a front end, which comprises:

orienting ends of a light emitting fiber and a light sensing fiber with the first object positioned therebetween, said light emitting and light sensing fibers being spaced on opposed sides of said first object, but aligned for said light sensing fiber to sense light from said light emitting fiber when an unobstructed path is present;

relatively moving said emitting and sensing fibers in aligned relation together towards said second object until the front face of said first object passes between said emitting and sensing fibers to permit light to pass between them and noting the position of said fibers and front face;

further relatively advancing said emitting and sensing fibers in aligned relation together until the second object front end passes between said emitting and sensing fibers to occlude light passing between them, and then again noting the position of said emitting and sensing fibers and second object end.

3. The method of claim 2 in which said first object is a laser diode chip and said second object is the light conducting portion of an end of an optical cable.

4. The method of claim 3 in which said optical cable end is thereafter oriented to receive maximum radiation from said laser diode chip and laser welded thereto.

5. The method of claim 2 in which said light emitting fiber and light sensing fiber are in acute angle relation to each other, each of said emitting and sensing fibers having a free end defining an angled, flat surface, whereby light passes from said emitting fiber to said sensing fiber on a path including reflection from said angled, flat surfaces.

6. The method of claim 2 in which said light emitted from said light emitting fiber is of oscillating intensity, and means associated with said light sensing fiber are provided to detect said light of oscillating intensity in the present of background light.

7. The method of claim 2 in which said light emitting and light sensing fibers are carried together in fixed relation to each other by sensor means, said sensor means and objects being relatively movable in three dimensions by translation stage means operated by encoder means and motor means, to permit stepped micromotion in said dimensions.

8. The method of claim 2 in which, prior to orienting ends of the light emitting fiber and the light sensing fiber with the first object, the ends of the light emitting fiber and light sensing fiber are brought into co-linear relation with the front end of said second object, and said second object is thereafter moved with said emitting and sensing fibers to keep said fibers and front end of the second object in said colinear relation.

9. The method of claim 2 in which, after the positions of said front face of the first object and end of the second object are noted, said first and second objects are relatively brought together to a position of close, predetermined spacing without touching.

10. An apparatus for measuring the microdistance between a pair of articles comprising, a first holder for holding and positioning one of said articles; a second holder for holding and positioning a second of said articles; sensor means which comprises a light emitting source and a light sensing fiber positioned in spaced relation from said source to receive light therefrom, said light sensing fiber conveying light to light detecting means; and means for relatively moving said sensor means and articles in steps of predetermined micromotion from one position where one of said pair of articles blocks light from said source from reaching said light sensing fiber to a second position where the other of said pair of articles blocks light from said source from reaching said light sensing fiber, to measure the distance therebetween.

11. The apparatus of claim 10 in which said light emitting source comprises an optical fiber having a free, light emitting end.

12. The apparatus of claim 10 in which said optical fiber and said light sensing fiber are in other than coaxial relation to each other, at least one of said fibers having a free end which defines an angled, flat surface, whereby light passes from said optical fiber to said sensing fiber on a path including reflection from said angled, flat surface.

13. The apparatus of claim 12 in which both fibers have an angled, flat, reflecting surface.

14. The apparatus of claim 10 in which said light emitting source includes means to provide light of oscillating intensity, said light detecting means being capable of detecting said oscillating light in the present of background light.

15. The apparatus of claim 10 in which said sensor means and articles are carried on translation stage means, to permit stepped micromotion of said sensor means and articles, and encoder means for determining the position of said sensor means.

16. The apparatus of claim 15 in which said sensor means may be moved by stepped micromotion in at least two dimensions, and the first object may be moved in at least two dimensions, the above dimensions including all three dimensions, and the second object may move with the sensor in at least one dimension transverse to the axis of said first and second objects.

17. A sensor of the position of small objects, which comprises:

a light emitting source; a light sensing fiber positioned in spaced relation from said source to receive light therefrom; light detecting means optically connected to said light sensing fiber; and means for moving said sensor in steps of predetermined micromotion to a position where a small object blocks light from said source from reaching said light sensing fiber.

18. The sensor of claim 17 in which said light emitting source comprises an optical fiber having a free, light emitting end.

19. The sensor of claim 18 in which said optical fiber and said light sensing fiber are in other than coaxial relation to each other, at least one of said fibers having a free end which defines an angled, flat surface, whereby light passes from said optical fiber to said sensing fiber on a path including reflection from said angled, flat surface.

20. The apparatus of claim 19 in which both fibers have an angled, flat surface.

21. The apparatus of claim 20 in which said light emitting source includes means to provide light of oscillating intensity, said light detecting means being capable of detecting said oscillating light in the presence of background light.

22. The apparatus of claim 21 in which said sensor is carried on translation stage, to permit stepped micromotion of said sensor, and encoder for determining the position of said sensor.

23. The apparatus of claim 19 in which said sensor may be moved by stepped micromotion in at least two dimensions.

24. A method of measuring the microdistance between a laser diode chip having a front face and a front end of an optica cable, which comprises:
    bringing the ends of a light emitting fiber and light sensing fiber into colinear relation with the front end of said optical cable, and thereafter moving said optical cable with said emitting and sensing fibers to keep said fibers and front end of the optical cable in said colinear relation; orienting ends of said light emitting fiber and light sensing fiber with the laser diode chip positioned therebetween, said light emitting and light sensing fibers being spaced on opposed sides of said chip to permit said light sensing fiber to sense light from said light emitting fiber when an unobstructed path is present, said light emitting fiber and light sensing fiber being in acute angle relation to each other, each of said emitting and sensing fibers having a free end defining an angled, flat surface whereby light passes from said emitting fiber to said sensing fiber, said path including reflection from said angled, flat surfaces;
    relatively moving said sensing and emitting fibers in aligned relation together toward said optical cable until the front face of said laser diode chip passes between said emitting and sensing fibers to permit light to pass between them, and noting the position of said fibers and front face;
    further relatively moving said emitting and sensing fibers in aligned relation together until the optical cable front end passes between said emitting and sensing fibers to occlude light passing between them, and then again noting the position of said emitting and sensing fibers and front end.

25. The method of claim 24 in which said optical cable end and laser diode chip are relatively brought together to a position of close, predetermined spacing without touching, and are thereafter oriented to cause the optical cable end to receive maximum radiation from said laser diode chip, following which said optical cable end and laser diode chip are laser welded together.

26. The method of claim 25 in which said light emitting and light sensing fibers are carried together in fixed relation with each other by sensor means, said sensor means, said laser diode chip and said optical cable being relatively movable in three dimensions by translation stage means operated by an encoder and motor means, to permit stepped micromotion in said three dimensions.

27. An apparatus for measuring the microdistance between a pair of articles comprising: a first holder for holding and positioning one of said articles; a second holder for holding and positioning a second of said articles; sensor means which comprises a light emitting source including an optical fiber having a free, light emitting end, and a light sensing fiber positioned in spaced relation from said light emitting fiber to receive light therefrom, said light sensing fiber conveying light to light detecting means, said light emitting fiber and light sensing fiber being in other than coaxial relation to each other, at least one of said fibers having a free end which defines an angled, flat surface, whereby light passes from said light emitting fiber to said light sensing fiber on a path including reflection from said angled, flat surface;
    and means for relatively moving said sensor means and articles in steps of predetermined micromotion from one position, where one of said pair of articles blocks light from said source from reaching said light sensing fiber, to a second position where the other of said pair of articles blocks light from said source from reaching said light sensing fiber, to measure the distance therebetween.

28. The apparatus of claim 27 in which said relative moving means includes translation stage means for carrying said sensor means and articles, to permit said micromotion of said sensor means and articles, and encoder means for determining the position of said sensor means.

29. The apparatus of claim 28 in which said sensor means may be moved by stepped micromotion in at least two dimensions, and the first article may be moved in at least two dimensions, the above dimensions including all three dimensions, and the second article may move with the sensor means in at least one dimension transverse to the axis between said first and second articles.

* * * * *